United States Patent [19]

Kan et al.

[11] Patent Number: 5,213,927

[45] Date of Patent: May 25, 1993

[54] INVERSE MULTIACTIVE ELECTROPHOTOGRAPHIC ELEMENT

[75] Inventors: Hsin C. Kan, Pittsford; Norman G. Rule, Rochester, both of N.Y.

[73] Assignee: Eastman Kodak Company, Rochester, N.Y.

[21] Appl. No.: 859,235

[22] Filed: Mar. 26, 1992

Related U.S. Application Data

[63] Continuation of Ser. No. 628,041, Dec. 17, 1990, abandoned.

[51] Int. Cl.$^5$ .............................................. G03G 5/14
[52] U.S. Cl. .................................. 430/59; 430/66; 430/84; 430/86
[58] Field of Search ......................... 430/59, 66, 84, 86

[56] References Cited

U.S. PATENT DOCUMENTS

| | | | |
|---|---|---|---|
| 3,041,166 | 6/1962 | Bardeen | 430/57 |
| 3,165,405 | 1/1965 | Hoestery | 430/57 |
| 3,394,001 | 7/1968 | Makino | 430/58 |
| 3,615,396 | 10/1971 | Gramza et al. | 96/1.6 |
| 3,679,405 | 7/1972 | Makino et al. | 430/57 |
| 3,725,058 | 4/1973 | Hayashi et al. | 430/58 |
| 4,175,960 | 11/1979 | Berwick et al. | 430/58 |
| 4,284,699 | 8/1981 | Berwick et al. | 430/96 |
| 4,378,415 | 3/1983 | Chu | 430/45 |
| 4,489,148 | 12/1984 | Horgan | 430/58 |
| 4,578,334 | 3/1986 | Borsenberger et al. | 430/59 |
| 4,666,802 | 5/1987 | Hung et al. | 430/58 |
| 4,701,396 | 10/1987 | Hung et al. | 430/58 |
| 4,719,163 | 1/1988 | Staudenmayer et al. | 430/58 |
| 4,734,346 | 3/1988 | Kumano et al. | 430/56 |
| 4,840,860 | 6/1989 | Staudenmayer et al. | 430/59 |
| 4,869,986 | 9/1989 | Riblett | 430/66 |

FOREIGN PATENT DOCUMENTS

| | | |
|---|---|---|
| 0123461 | 4/1984 | European Pat. Off. . |
| 55-050249 | 4/1980 | Japan . |
| 55-134855 | 10/1980 | Japan . |
| 62-058271 | 3/1987 | Japan . |
| 62-115463 | 5/1987 | Japan . |
| 62-255953 | 11/1987 | Japan . |

*Primary Examiner*—Marion E. McCamish
*Assistant Examiner*—S. Rosasco
*Attorney, Agent, or Firm*—David F. Janci

[57] ABSTRACT

New inverse multiactive electrophotographic elements comprise, in order:
an electrically conductive layer;
a charge-transport layer;
a first charge-generation layer containing a charge-generation material and a charge-transport material; and
a second charge-generation layer containing a charge-generation material and a charge-transport material different from and less susceptible to positive-surface-charge injection than the charge-transport material of the first charge-generation layer.

10 Claims, No Drawings

INVERSE MULTIACTIVE ELECTROPHOTOGRAPHIC ELEMENT

This is a continuation of application Ser. No. 07/628,041, filed Dec. 17, 1990 now abandoned.

FIELD OF THE INVENTION

This invention relates to multiactive electrophotographic elements, i.e., elements containing at least an electrically conductive layer, a charge-generation layer, and a charge-transport layer. More particularly, the invention relates to such elements that are suitable to be initially positively charged, that are suitable for electrophotographic discharge by means of positive-charge-hole transport, and that have an "inverse" arrangement of layers, wherein the charge-transport layer is situated between the electrically conductive layer and the charge-generation layer.

BACKGROUND

In electrophotography an image comprising a pattern of electrostatic potential (also referred to as an electrostatic latent image), is formed on a surface of an electrophotographic element comprising at least an insulative photoconductive layer and an electrically conductive substrate. The electrostatic latent image is usually formed by imagewise radiation-induced discharge of a uniform potential previously formed on the surface. Typically, the electrostatic latent image is then developed into a toner image by bringing an electrographic developer into contact with the latent image. If desired, the latent image can be transferred to another surface before development.

In latent-image formation the imagewise discharge is brought about by the radiation-induced creation of pairs of negative-charge electrons and positive-charge holes, which are generated by a material (often referred to as a charge-generation material) in the electrophotographic element in response to exposure to the imagewise actinic radiation. Depending upon the polarity of the initially uniform electrostatic potential and the type of materials included in the electrophotographic element, either the holes or the electrons that have been generated migrate toward the charged surface of the element in the exposed areas and thereby cause the imagewise discharge of the initial potential. What remains is a non-uniform potential constituting the electrostatic latent image.

Among the various known types of electrophotographic elements are those generally referred to as multiactive elements (also sometimes called multilayer or multi-active-layer elements). Multiactive elements are so named, because they contain at least two active layers, at least one of which is capable of generating electron/hole pairs in response to exposure to actinic radiation and is referred to as a charge-generation layer (hereinafter also referred to as a CGL), and at least one of which is capable of accepting and transporting charges generated by the charge-generation layer and is referred to as a charge-transport layer (hereinafter also referred to as a CTL). Such elements typically comprise at least an electrically conductive layer, a CGL, and a CTL. Either the CGL or the CTL is in electrical contact with both the electrically conductive layer and the remaining CGL or CTL. The CGL comprises at least a charge-generation material; the CTL comprises at least a charge-transport material (a material which readily accepts holes and/or electrons generated by the charge-generation material in the CGL and facilitates their migration through the CTL in order to cause imagewise electrical discharge of the element and thereby create the electrostatic latent image); and either or both layers may additionally comprise a film-forming polymeric binder.

Many multiactive electrophotographic elements currently in use are designed to be initially charged with a negative polarity and to be developed with a positively charged toner material. Usually, the arrangement of layers in such elements has the CGL situated between the CTL and the electrically conductive layer, so that the CTL is the uppermost of the three layers, and its outer surface bears the initial negative charge (although in some cases there may be a protective overcoat over the CTL which bears the initial charge). Such elements contain a charge-transport material in the CTL which facilitates the migration of positive holes (generated in the CGL) toward the negatively charged CTL surface in imagewise exposed areas in order to cause imagewise discharge. Such material is often referred to as a hole-transport material. In elements of that type a positively charged toner material is then used to develop the remaining imagewise unexposed portions of the negative-polarity potential (i.e., the latent image) into a toner image. Because of the wide use of negatively charging elements, considerable numbers and types of positively charging toners have been fashioned and are available for use in electrographic developers. Conversely, fewer high quality negatively charging toners are available.

However, for some applications of electrophotography it is more desirable to be able to develop the surface areas of the element that have been imagewise exposed to actinic radiation, rather than those that remain imagewise unexposed. For example, in electrophotographic printing of alphanumeric characters it is more desirable to be able to expose the relatively small percentage of surface area that will actually be developed to form visible alphanumeric toner images, rather than waste energy exposing the relatively large percentage of surface area that will constitute undeveloped background portions of the final image. In order to accomplish this while still employing widely available high quality positively charging toners, it is necessary to use an electrophotographic element that is designed to be positively charged. Thus, positive toner can then be used to develop the exposed surface areas (which will have relatively negative electrostatic potential after exposure and discharge, compared with the unexposed areas, where the initial positive potential will remain).

A multiactive electrophotographic element can be designed to be initially positively charged and still have the layer arrangement wherein the CGL is situated between the CTL and the electrically conductive layer. However, such an element must contain an adequate electron-transport agent (i.e., a material which adequately facilitates the migration of photo-generated electrons toward the positively charged insulative element surface) in its CTL. Unfortunately (and analogous to the situation with positive and negative toners), many materials having good hole-transport properties have been fashioned for use in electrophotographic elements, but relatively few materials are known to provide good electron-transport properties in electrophotographic elements.

Fortunately, a multiactive electrophotographic element can be designed to be positively charged while containing only a good hole-transport material in its CTL (rather than an electron-transport material), if a different arrangement of layers is employed, namely, wherein the CTL is situated between the CGL and the electrically conductive layer. Such elements are sometimes referred to as inverse multiactive elements and are known in the art (see, for example U.S. Pat. No. 4,175,960, FIGS. 6a through 6d). In inverse multiactive elements that are initially positively charged, the positive charge resides at the uppermost surface of the CGL, which is the uppermost of the three layers. Upon imagewise exposure of the inverse element, electron/hole pairs are created as usual in the imagewise exposed portions of the CGL, but in this case the photogenerated electrons migrate to the positively charged upper surface of the CGL, while the photogenerated holes migrate through the lower surface of the CGL and then downwardly through the CTL (their migration being facilitated by the hole-transport material in the CTL) to the electrically conductive layer.

It is also known that in multiactive elements that employ hole-transport materials in the CTL, it can also be beneficial to additionally include a hole-transport material in the CGL (in addition to the charge-generation material that must be there) in order to facilitate the migration of photo-generated holes through the CGL. See, for example, U.S. Pat. No. 4,175,960.

As mentioned above, many useful hole-transport materials are known in the art. See, again, for example, U.S. Pat. No. 4,175,960. Two types of such known useful hole-transport materials, among many others that are known, are triarylamines and polyarylalkanes.

The term, "triarylamine," as used herein is intended to mean any chemical compound containing at least one nitrogen atom that is bonded by at least three single bonds directly to aromatic rings or ring systems. The aromatic rings or ring systems can be unsubstituted or can be further bonded to any number and any types of substituents.

The term, "polyarylalkane," as used herein, is intended to mean any chemical compound containing an alkane group having at least one of its alkane carbon atoms bonded by at least two single bonds directly to aromatic rings or ring systems (which aromatic rings or ring systems can be unsubstituted or can be further bonded to any number and any types of substituents), with the proviso that such compound does not contain a nitrogen atom that is bonded by at least three single bonds directly to aromatic rings or ring systems (i.e., such compound does not contain a triarylamine moiety).

The present inventors have recognized a number of drawbacks associated with inverse multiactive elements that are intended to be positively charged on the outer surface of the CGL and that have a hole-transport material, in addition to a charge-generation material, in the CGL.

For example, the present inventors have recognized that some charge-transport materials are very efficient at transporting positive-charge holes generated by charge-generation materials but are also significantly susceptible to injection of positive charge from the positively charged outer surface of the CGL (sometimes also referred to as "positive-surface-charge injection"), and they have recognized that most triarylamines are charge-transport materials of this type. The present inventors have further recognized that if an inverse multiactive element, as previously described, contains this type of charge-transport material (in addition to a charge-generation material) in its CGL, the element will exhibit less than desirable charge uniformity and lower and less stable than desirable charge acceptance upon cycling. The term, "charge uniformity" refers to the degree of variation of the level of potential at various points on the initially charged electrophotographic element, before imagewise exposure and discharge; a low degree of potential variation among various points corresponds to high charge uniformity and vice versa. The phrase, "charge acceptance upon cycling," refers to the capability of the element to be initially charged to the desired level of potential at the beginning of each cycle of its normal operation (a cycle being the sequence of operation comprising initially uniformly charging the element, then exposing the element imagewise to actinic radiation to form the electrostatic latent image, followed by erasure of the remaining potential on the element to prepare it for the next cycle of operation) after a plurality of such cycles of operation have been carried out. "Low charge acceptance upon cycling," means that, at least after a number of cycles of operation, the element has a relatively poor capability of being initially charged to the desired level of potential. "Less stable charge acceptance upon cycling," means that the capability of the element to be initially charged to the desired level of potential changes very significantly after a plurality of cycles of operation. The present inventors believe that relatively low and less stable positive-charge acceptance upon cycling are reliable indicators that the charge-transport material in the CGL has a relatively high degree of susceptibility to positive-surface-charge injection.

Also, for example, the present inventors have recognized that some other charge-transport materials are less efficient at transporting positive-charge holes and less susceptible to positive-surface-charge injection than, e.g., triarylamines, and they have recognized that most polyarylalkanes (as defined above) are charge-transport materials of this type. The present inventors have further recognized that if an inverse multiactive element, as previously described, contains this type of charge-transport material (in addition to a charge-generation material) in its CGL, the element will exhibit lower than desirable photosensitivity and, after one or more cycles of operation, higher than desirable residual potential. The term, "photosensitivity" (sometimes also commonly referred to as electrophotographic speed) refers to the amount of incident actinic radiant energy to which the element must be exposed in order to achieve the desired degree of discharge of the initial potential to which the element was initially charged. The lesser the amount of radiant energy required for such discharge is, the higher is the photosensitivity, and vice versa. The term, "residual potential," refers to the final potential to which the element can be driven by the erasure step (e.g., by exposure to excess amounts of actinic radiation) at the end of a cycle of operation. Lower residual potential is more desirable, because if the residual potential is higher than the level of potential intended to be reached by discharge of the element in areas of maximum imagewise exposure during latent image formation, that intended level of potential will not be reached, and the latent image will constitute an inaccurate record of the image intended to be represented.

The present inventors were faced with the problem of providing an inverse multiactive electrophotographic element that avoids or minimizes the drawbacks discussed above, i.e., an element that will exhibit, during its normal operation, relatively high charge uniformity, relatively high and stable charge acceptance upon cycling, relatively high photosensitivity, and relatively low residual potential.

SUMMARY OF THE INVENTION

The present invention solves the above-noted problem by providing a multiactive electrophotographic element comprising the following layers in the order stated:

an electrically conductive layer;

a charge-transport layer;

a first charge-generation layer containing a charge-generation material and a first charge-transport material; and a second charge-generation layer containing a charge-generation material and a second charge-transport material, wherein the second charge-transport material is less susceptible to positive-surface-charge injection than is the first charge-transport material.

It should be appreciated that the essential differences of this inventive element from the typical inverse multiactive elements previously described are that the inventive element comprises an additional (second) CGL (hereinafter sometimes also referred to as CGLII) over the first CGL (hereinafter sometimes also referred to as CGLI), and that CGLII contains a charge-transport material capable of accepting and transporting photogenerated positive-charge holes, but less susceptible to positive-surface-charge injection (from the outermost surface of CGLII, which will be positively charged in the first step of each cycle of the intended method of operation of the element) than the charge-transport material (that is capable of accepting and transporting photogenerated holes) contained in CGLI.

It has been unexpectedly found that (all other things being equal) the inventive element exhibits higher charge uniformity and higher and more stable charge acceptance upon cycling than does a typical inverse multiactive electrophotographic element (having only a single CGL) that contains in its CGL the same charge-transport material that is contained in CGLI of the inventive element.

It has also been unexpectedly found that (all other things being equal) the inventive element exhibits higher photosensitivity and lower residual potential than does a typical inverse multiactive electrophotographic element (having only a single CGL) that contains in its CGL the same charge-transport material that is contained in CGLII of the inventive element.

Thus, the present invention provides an inverse multiactive electrophotographic element that exhibits, during its intended method of operation, relatively high charge uniformity, relatively high and stable charge acceptance upon cycling, relatively high photosensitivity, and relatively low residual potential.

DESCRIPTION OF PREFERRED EMBODIMENTS

As noted above, the only essential differences of elements of this invention from known inverse multiactive electrophotographic elements lie in the provision of an additional charge-generation layer and in the nature of the charge-transport materials contained in the two charge-generation layers. In virtually all other respects in regard to composition, proportions, preparation, and use, the inventive elements can be the same as other inverse multiactive electrophotographic elements described in the prior art. Note that the CTL in elements of the invention should be capable of accepting and transporting positive-charge holes generated in the CGL's of the inventive elements. For detailed description of those aspects that elements of the invention have in common with other known multiactive elements, see, for example, U.S. Pat. Nos. 3,041,166; 3,165,405; 3,394,001; 3,679,405; 3,725,058; 4,175,960; 4,284,699; 4,578,334; 4,666,802; 4,701,396; 4,719,163; and 4,840,860, the disclosures of which are hereby incorporated herein by reference. A partial listing of layers and components that the elements of this invention can have in common with known multiactive electrophotographic elements includes, for example: electrically conductive layers and supports bearing such conductive layers; charge-transport layers capable of accepting and transporting positive-charge holes generated in charge-generation layers; optional subbing layers, barrier layers, and screening layers; polymeric binders useful for forming any of the previously mentioned layers (including charge-generation layers); charge-generation materials capable of generating electron/hole pairs in response to exposure to actinic radiation; charge-transport materials capable of accepting and transporting positive-charge holes generated by charge-generation materials; and optional leveling agents, surfactants, plasticizers, sensitizers, contrast-control agents, and release agents.

Both CGLI and CGLII in elements of the invention can comprise materials well known to be useful in charge-generation layers in the prior art, e.g., binders, charge-generation materials, and charge-transport materials, and can be prepared by any of the methods well known in the art.

For example, charge-generation materials can be organic or inorganic and can be monomeric or polymeric. They can be sensitive to relatively broad or narrow ranges of wavelengths of radiation. They can be homogeneously or heterogeneously (e.g., as well known aggregate co-crystalline dye-polymer complexes) dispersed or dissolved in binders. They can serve also as the layer's binder when they are polymeric. They can form a layer containing no polymeric binder when coated by methods such as vacuum deposition. The charge-generation materials in CGLI and CGLII can be the same or different and can be chosen to be or can be combined with appropriate sensitizers in order to be sensitive to the same or different wavelengths of radiation.

The charge-transport materials included in the CTL and in CGLI and CGLII can be chosen from among any of the many known charge-transport materials capable of accepting and transporting photogenerated positive-charge holes (see, for example, U.S. Pat. No. 4,175,960), and mixtures of such known materials can also be used. The charge-transport material in the CTL can be the same as or different from either of the charge-transport materials in CGLI and CGLII, but for best performance of the element it is preferred that the CTL contain a charge-transport material of the type that is highly efficient at accepting and transporting holes (e.g., a triarylamine). The only restriction on the choice of appropriate hole-transporting charge-transport materials for CGLI and CGLII is that they be different from each other, such that the charge-transport material in CGLII is less susceptible to positive-surface-charge injection than the charge-transport material in CGLI. A presently preferred choice is to include a triarylamine charge-transport material in CGLI and a polyarylalkane charge-transport material in CGLII, but other pairs of different materials having the appropriate relative susceptibilities to positive-surface-charge injection can be chosen if desired.

As previously mentioned, one method of determining relative susceptibilities of charge-transport materials is to include the materials singly as the charge-transport material in the single CGL of a typical inverse multiactive element, subject the element to a plurality of cycles of normal operation, and measure the positive charge (potential) accepted by the element during the first (i.e., initial charging) step of each cycle. Between any two different charge-transport materials having significantly different susceptibilities, the one included in the CGL of the element that exhibits relatively higher and more stable positive-charge acceptance upon cycling is the one that is less susceptible to positive-surface-charge injection.

The following Examples are presented to further illustrate some preferred inverse multiactive electrophotographic elements of the invention and to compare their properties and performance with those of elements outside the scope of the invention. In some of the Examples the element performance is illustrated in regard to charge uniformity, charge acceptance upon cycling, photosensitivity, and/or residual potential.

In illustrating charge uniformity in some of the Examples, the element under consideration was subjected to corona-charging at a potential of 500 volts in order to attempt to establish an initial uniform positive charge potential on the outer surface of CGLII (or on the outer surface of the single CGL in the case of Control elements) of 500 volts (the potential being measured between the outermost CGL surface and the electrically conductive layer). The resulting initial potential was then measured at 1000 individual points on the outermost CGL surface, and the degree of potential variation among those points was statistically calculated. In the tables of performance data accompanying some of the Examples, charge uniformity is reported in terms of the standard deviation of the initial potential among the various points (referred to as $\sigma Vo$ and expressed in terms of volts). The lower the $\sigma Vo$ voltage is, the higher is the charge uniformity.

In illustrating charge acceptance upon cycling in some of the Examples, the element under consideration was subjected to 500 cycles of normal operation. Each cycle involved: initial corona-charging at 500 volts; then exposing the element, uniformly through the outermost CGL surface, to actinic radiation (radiation having peak intensity at a wavelength to which the charge-generation materials in the CGL's are sensitive in order to generate electron/hole pairs) in sufficient amount to cause partial discharge of the initial voltage, in order to simulate normal imaging exposure; followed by attempted erasure of the remaining potential (by exposure of the element to an excess amount of actinic radiation) to prepare the element for the next cycle. The initial voltages actually established (i.e., accepted) on the element after the first step of the first cycle (referred to as $Vo(1)$ and after the first step of the 500th cycle (referred to as $Vo(500)$ were measured, and the change in initial charge acceptance from the first to the 500th cycle (referred to as $\Delta Vo$) was calculated by subtracting the $Vo(500)$ measured voltage from the $Vo(1)$ measured voltage. The values for $Vo(1)$, $Vo(500)$, and $\Delta Vo$ are expressed in terms of volts and reported in the tables of performance data accompanying some of the Examples. Relatively higher $Vo(500)$ voltages correspond to relatively higher charge acceptance upon cycling. Relatively higher $\Delta Vo$ voltages correspond to relatively less stable charge acceptance upon cycling.

In illustrating residual potential in some of the Examples, the element under consideration was subjected to 500 cycles of normal operation as described in the preceding paragraph. The voltages remaining on the element after attempted erasure in the last step of the first cycle (referred to as $V_R(1)$) and after the last step of the 500th cycle (referred to as $V_R(500)$) were measured. The values in volts of $V_R(1)$ and $V_R(500)$ comprise the residual potentials after the first and 500th cycles, respectively, and are reported in the tables of performance data accompanying some of the Examples. As previously discussed, relatively lower values for $V_R(1)$ and $V_R(500)$ represent better performance.

In illustrating photosensitivity (electrophotographic speed) in some of the Examples, the element under consideration was initially charged to a positive potential (about 500 volts) and then exposed, gradually and uniformly through the outermost CGL surface, to actinic radiation up to an amount just sufficient to discharge 50% of the initial potential. In the tables of performance data accompanying some of the Examples, this amount of radiation just sufficient to discharge half of the initial potential is referred to as $E(Vo-50\%)$ and is reported in terms of ergs/cm$^2$. As previously discussed, relatively lower values of $E(Vo-50\%)$ correspond to relatively higher photosensitivity.

EXAMPLE 1 AND CONTROL A

An inverse multiactive electrophotographic element, Example 1, in accordance with the present invention was prepared as follows.

An electrically-conductive-layer-coated support was prepared by vacuum-depositing a thin conductive layer of nickel onto a poly(ethylene terephthalate) film support.

A charge-transport layer (CTL) was then solvent-coated onto the electrically conductive layer to form a dry coverage of 10 g/m$^2$. The coating solution comprised a 10 weight % concentration of solids in dichloromethane. The solids comprised: 57.5 weight % bisphenol-A-polycarbonate to serve as binder; 2.5 weight % poly(ethylene-co-neopentylene terephthalate) to serve as binder; 20 weight % 1,1-bis[4-(di-4-tolylamino)phenyl] cyclohexane, a triarylamine charge-transport material; and 20 weight % tri-4-tolylamine, another triarylamine charge-transport material.

A first heterogeneous charge-generation layer (CGLI) was then solvent-coated onto the CTL to form a dry coverage of 12 g/m$^2$. The coating solution comprised a 10 weight % concentration of solids in a 70:30 (weight ratio) mixture of dichloromethane and 1,1,1-trichloroethane. The solids comprised: 58 weight % bisphenol-A-polycarbonate to serve as polymeric binder and to form co-crystalline aggregate charge-generation material with dyes; 1.6 weight % of the dye, 4-(4-N,N-dimethylaminophenyl)-2,6-diphenylthiapyrylium hexafluorophosphate, and 0.4 weight % of the dye, 4-(4-N,N-dimethylaminophenyl)-2-(4-ethoxyphenyl)-6-phenylthiapyrylium fluoroborate, both dyes to form co-crystalline aggregate charge-generation material with some of the polycarbonate; and 40 weight % 1,1-bis[4-(di-4-tolylamino)phenyl]cyclohexane, a triarylamine charge-transport material. The coating solution and layer were formed by the so-called "dye-first" method of forming heterogeneous aggregate charge-generation layers, as known in the art and generally described, for example, in U.S. Pat. No. 3,615,396 (the disclosure of which is hereby incorporated herein by reference), wherein the dyes are added first to the solvent solution and thoroughly stirred in to dissolve them before the charge-transport material and polymer are added to the solution, and wherein, during the evaporation of the solvents from the coated layer, some of the polymer forms a discontinuous phase of particulate (aggregate) co-crystalline complexes of polymer and dye (that serve as the charge-generation material) within a continuous phase of a solid solution of the polymeric binder and charge-transport material.

A second heterogeneous charge-generation layer (CGLII) was then solvent-coated onto CGLI to form a dry coverage of 4 g/m$^2$. The coating solution comprised an 8 weight % concentration of solids in a 70:30 (weight ratio) mixture of dichloromethane and 1,1,2-trichloroethane. The solids comprised: 52 weight % bisphenol-A-polycarbonate to serve as polymeric binder and to form co-crystalline aggregate charge-generation material with dyes; 6.4 weight % of the dye, 4-(4-N,N-dimethylaminophenyl)-2,6-diphenylthiapyrylium hexafluorophosphate, and 1.6 weight % of the dye, 4-(4-N,N-dimethylaminophenyl)-2-(4-ethoxyphenyl)-6-phenylthiapyrylium fluoroborate, both dyes to form co-crystalline aggregate charge-generation material with some of the polycarbonate; and 40 weight % 4-(diethylamino)tetraphenylmethane, a polyarylalkane charge-transport material having less susceptibility to positive-surface-charge injection than the triarylamine charge-transport material of CGLI. As with CGLI, the CGLII coating solution and layer were formed by the so-called "dye-first" method of forming heterogeneous aggregate charge-generation layers.

For comparison purposes an inverse multiactive electrophotographic element, typical of the prior art and outside the scope of the present invention, was also prepared and is referred to as Control A. The composition and preparation of the Control A element were similar to that of the inventive element of Example 1, except that Control A comprised only a single CGL on the CTL. This CGL was essentially the same as CGLII of Example 1 (containing the same polyarylalkane as the sole charge-transport material and the same binder and dyes), except that it was coated to form a dry coverage of 16 g/m$^2$ (i.e., equal to the combined coverage of CGLI and CGLII in Example 1), and except that its coating solution comprised 11 weight % solids (with the solids comprising 56 weight % polycarbonate, 4 weight % dyes, and 40 weight % charge-transport material).

The Example 1 and Control A elements were tested for performance in regard to photosensitivity and residual potential. Results are presented in Table I.

TABLE I

| Example | E(Vo-50%) (ergs/cm$^2$) | $V_R(1)$ (volts) | $V_R(500)$ (volts) |
|---|---|---|---|
| 1 | 2.6 | 22 | 31 |
| Control A | 7.7 | 83 | 227 |

The data in Table I show that an element of the invention exhibits higher photosensitivity [lower E(Vo-50%)] and lower residual potential [lower $V_R(1)$ and lower $V_R(500)$] than a typical prior-art element having only a single CGL, containing a polyarylalkane charge-transport material.

EXAMPLE 2 AND CONTROL B

Another inverse multiactive electrophotographic element of the invention, Example 2, was prepared. Its composition and preparation were the same as in Example 1, except that: the charge-transport material in the CTL and in CGLI was 4-(di-4-tolylamino)-4'-[4-(di-4-tolylamino)styryl]-stilbene, another triarylamine; the charge-transport material in CGLII was 4,4'-bis(diethylamino)tetraphenylmethane, another polyarylalkane having less susceptibility to positive-surface-charge injection than the triarylamine of CGLI; and the dry coverages of CGLI and CGLII were 10 g/m$^2$ and 6 g/m$^2$, respectively.

For comparison purposes another inverse multiactive electrophotographic element, typical of the prior art and outside the scope of the present invention, was also prepared and is referred to as Control B. The composition and preparation of the Control B element were the same as those of the Control A element, except that the charge-transport material in the CTL was the same triarylamine as in the CTL of Example 2, and the charge-transport material in the sole CGL was the same polyarylalkane as in CGLII of Example 2.

The Example 2 and Control elements were tested for performance in regard to photosensitivity and residual potential. Results are presented in Table II.

TABLE II

| Example | E(Vo-50%) (ergs/cm$^2$) | $V_R(1)$ (volts) | $V_R(500)$ (volts) |
|---|---|---|---|
| 2 | 2.1 | 19 | 26 |
| Control B | 3.5 | 57 | 68 |

The data in Table II show that another element of the invention exhibits higher photosensitivity [lower E(Vo-50%)] and lower residual potential [lower $V_R(1)$ and lower $V_R(500)$] than another typical prior-art element having only a single CGL, containing a polyarylalkane charge-transport material.

EXAMPLES 3-6 AND CONTROL C

Four different inverse multiactive electrophotographic elements of the invention, Examples 3-6, were prepared. Their compositions and preparations were the same as in Example 1, except that: the charge-transport material in CGLII of Example 4 was 4-(dimethylamino)tetraphenylmethane, another polyarylalkane; the charge-transport material in CGLII of Example 5 was 4-diethylamino-4'-nitro-tetraphenylmethane, another polyarylalkane; and the charge-transport material in CGLII of Example 6 was bis(4-chlorophenyl)-bis(4-N,N-diethylaminophenyl)methane, another polyarylalkane.

For comparison purposes another inverse multiactive electrophotographic element, typical of the prior art and outside the scope of the present invention, was also prepared and is referred to as Control C. The composition and preparation of the Control C element were the same as the Control A element, except that the charge-transport material in the sole CGL was the same triarylamine as in CGLI of Examples 1, 3, 4, 5, and 6.

The Example 3, 4, 5, and 6 and Control C elements were tested for performance in regard to charge uniformity and charge acceptance upon cycling. Results are presented in Table III.

TABLE III

| Example | $\sigma Vo$ (volts) | $Vo(1)$ (volts) | $Vo(500)$ (volts) | $\Delta Vo$ (volts) |
|---|---|---|---|---|
| Control C | 1.6 | 495 | 429 | 66 |
| 3 | 0.81 | 491 | 466 | 25 |
| 4 | 0.79 | 492 | 454 | 38 |
| 5 | 0.59 | 482 | 445 | 37 |
| 6 | 0.81 | 487 | 462 | 25 |

The data in Table III show that elements of the invention exhibit higher charge uniformity (lower $\sigma Vo$), higher charge acceptance upon cycling [higher $Vo(500)$], and more stable charge acceptance upon cycling (lower $\Delta Vo$) than a typical prior art element having only a single CGL, containing a triarylamine charge-transport material.

EXAMPLE 7 AND CONTROL D

Another inverse multiactive electrophotographic element, Example 7, of the invention was prepared. Its composition and preparation were the same as in Example 1, except that: CGLI and CGLII were homogeneously dispersed CGL's, each comprising a solid solution of polymeric binder and charge-transport material, having charge-generation material homogeneously dispersed therein; the charge-generation material in CGLI and CGLII was titanyl tetrafluorophthalocyanine (described more extensively in U.S. Pat. No. 4,701,396); the polymeric binder in CGLII was a polyester formed from 4,4'-(2-norbornylidene)diphenol and terephthalic acid:azelaic acid (40:60 molar ratio); and CGLII was solvent-coated from a solution comprising 8 weight % concentration of solids in toluene, wherein the solids comprised 57 weight % polymeric binder, 3 weight % charge-generation material, and 40 weight % charge-transport material. The charge-transport materials in the CTL, CGLI, and CGLII were the same as in Example 1, and the binders in the CTL and CGLI were bisphenol-A-polycarbonates.

For purposes of comparison another inverse multiactive electrophotographic element, typical of the prior art and outside the scope of the present invention, was also prepared and is referred to as Control D. The composition and preparation of the Control D element were the same as the Control A element, except that the sole CGL was a homogeneously dispersed CGL, composed and prepared the same as CGLI of Example 7, except that the dry coverage was 16 g/m² (as in the Control A element).

The Example 7 and Control D elements were tested for performance in regard to charge uniformity and charge acceptance upon cycling. Results are presented in Table IV.

TABLE IV

| Example | $\sigma Vo$ (volts) | $Vo(1)$ (volts) | $Vo(500)$ (volts) | $\Delta Vo$ (volts) |
|---|---|---|---|---|
| Control D | 1.9 | 369 | 187 | 182 |
| 7 | 0.85 | 470 | 378 | 92 |

The data in Table IV show that an element of the invention having homogeneously dispersed CGL's exhibits higher charge uniformity (lower $\sigma Vo$), higher charge acceptance upon cycling [higher $Vo(500)$], and more stable charge acceptance upon cycling (lower $\Delta Vo$) than a typical prior-art element having only a single homogeneously dispersed CGL, containing a triarylamine charge-transport material.

EXAMPLES 8 AND 9

Two other inverse multiactive electrophotographic elements, Examples 8 and 9, of the invention were prepared. Their composition and preparation were the same as in Example 7, except that CGLII in Example 8 was composed and prepared the same as CGLII in Example 1, and CGLI in Example 9 was composed and prepared the same as CGLI in Example 1.

The Example 8 and 9 elements were tested for performance in regard to photosensitivity, charge uniformity, residual potential, and charge acceptance upon cycling. Results are presented in Table V and show that elements of the invention, wherein one of CGLI or CGLII is heterogeneous and the other is homogeneously dispersed, exhibit fair electrophotographic performance.

TABLE V

| Example | $E(Vo-50\%)$ (ergs/cm²) | $\sigma Vo$ (volts) | $V_R(1)$ (volts) | $V_R(500)$ (volts) | $Vo(1)$ (volts) | $Vo(500)$ (volts) | $\Delta Vo$ (volts) |
|---|---|---|---|---|---|---|---|
| 8 | 3.5 | 0.65 | 16 | 18 | 462 | 424 | 38 |
| 9 | 4.0 | 0.51 | 83 | 121 | 497 | 443 | 54 |

The invention has been described in detail with particular reference to certain preferred embodiments thereof, but it should be appreciated that variations and modifications can be effected within the spirit and scope of the invention.

What is claimed is:

1. A multiactive electrophotographic element comprising the following layers in the order stated:
    an electronically conductive layer;
    a charge-transport layer;
    a first charge-generation layer containing a charge-generation material and a first charge-transport material; and
    a second charge-generation layer containing a charge-generation material and a second charge-transport material;
    wherein the second charge-transport material is less susceptible to positive-surface-charge injection than is the first charge-trasport material, and wherein the charge-transport layer contains a charge-transport material that is at least as susceptible to positive-surface-charge injection as the first charge-transport material is.

2. The multiactive electrophotographic element of claim 1, wherein the first charge-transport material comprises an organic material.

3. The multiactive electrophotographic element of claim 1, wherein the second charge-transport material comprises an organic material.

4. The multiactive electrophotographic element of claim 1, wherein the first charge-transport material comprises a triarylamine.

5. The multiactive electrophotographic element of claim 1, wherein the second charge-transport material comprises a polyarylalkane.

6. The multiactive electrophotographic element of claim 1, wherein the charge-generation material in the first charge-generation layer comprises a co-crystalline complex of a dye and a polymer.

7. The multiactive electrophotographic element of claim 1, wherein the charge-generation material in the second charge-generation layer comprises a co-crystalline complex of a dye and a polymer.

8. The multiactive electrophotographic element of claim 1, wherein the first charge-transport material comprises 1,1-bis[4(di-4-tolylamino)phenyl]-cyclohexane or 4-(di-4-tolylamino)-4'-[4-(di-4-tolylamino)styryl]-stilbene.

9. The multiactive electrophotographic element of claim 1, wherein the second charge-transport material comprises: 4-(diethylamino)tetraphenylmethane; 4,4'-bis (dimethylamino)tetraphenylmethane; 4-(dimethylamino)tetraphenylmethane; 4-diethylamino-4'-nitrotetraphenylmethane; or bis(4-chlorophenyl)bis(4-N,N-diethylaminophenyl)methane.

10. The multiactive electrophotographic element of claim 1, wherein each of the charge-generation materials in the first and second charge-generation layers comprises a co-crystalline complex of a dye and a polymer, the first charge-transport material comprises 4-(di-4-tolylamino)-4'-[4-(di-4-tolylamino)styryl]stilbene, and the second charge-transport material comprises 4,4'-bis(diethylamino)tetraphenylmethane.

* * * * *